Patented Mar. 3, 1942

2,275,217

UNITED STATES PATENT OFFICE 2,275,217

ELECTROLYTIC PROCESS OF TREATING WHOLE DISTILLERY SLOP

Charles J. Brockman, Athens, Ga.

No Drawing. Application June 9, 1937, Serial No. 147,353

3 Claims. (Cl. 204—137)

This invention relates to the electrolytic treatment of waste slop produced from the manufacture of whiskey, alcohol, or other distilled alcohol containing liquors to recover therefrom valuable solids, as by-products, and to render the remaining liquid inoffensive and facilitate its disposal.

In the manufacture of distilled alcoholic compositions, grain, Irish potatoes or other starchy raw material is ordinarily ground, cooked with water to pastify it and hydrolize the starch, and malt is then added to saccharinify the starch to maltose. The resultant mixture, known as mash, is inoculated with yeast and fermentation allowed to proceed. When the fermentation is complete the material is distilled to remove the alcohol, leaving a liquid known as "whole slop" which contains comminuted solids of a putrifiable nature.

The disposal of waste slop has been a serious problem in the distilling industry, not only because such slop emanates offensive odors, but when discharged into streams or rivers it causes pollution, kills the fish and is a menace to health.

In attempting to minimize these detrimental effects it has been the rather general practice to remove as much of the solid matter from whole slop as possible by screening and to discard the remaining thin slop. The thin slop, however, also contains solid matter, but in a too finely divided condition to be removed by screening. In spite of the fact that the finely divided solids would constitute a salable by-product of distilling processes, the evaporation of large quantities of water for their recovery is not economically feasible.

It has heretofore been considered impracticable to subject whole slop to electrolysis because of its thick consistency and the difficulty which would be experienced in obtaining complete coagulation of the contained solid matter, but I have discovered that under controlled conditions a more rapid coagulation is effected when whole slop is electrolyzed than in the processes which preliminarily screen it and electrically treat the thin slop alone. The elimination of the step of screening whole slop facilitates recovery of the solids and reduces the cost of producing the by-product.

It is accordingly an object of my invention to provide a more economical process for the treatment of distillery waste by electrolyzing whole slop under controlled conditions.

Another object of my invention is to electrolyze whole slop in heated condition by either direct or alternating current.

A further object of my invention is to provide a process for cheaply and effectively rendering distillery waste inoffensive, so that after the removal of salable by-products it may be dumped into streams or otherwise discarded without objectionable consequences.

These and other objects of my invention are achieved, briefly, in subjecting whole slop with all of its contained solids to the electrolyzing action of direct current of at least 30 amperes per square foot of electrode surface, or alternating current of about 4 volts and 150 amperes per square foot of electrode surface with the pH value controlled to within the limits of 3.6 and 7.0, the whole slop being treated in hot condition and either with or without the addition of a small quantity of common salt or of materials which will increase the alkalinity of the final product.

As a specific example, about 0.5% by weight of common salt or of alkali is added to whole slop which is heated to a temperature of from 120° to 180° Fahrenheit. The whole slop is then treated in batch or circulated through apparatus between electrodes to which direct or alternating current is applied. In the case of direct current, the density should not be less than 30 amperes per square foot of electrode surface whereas for alternating current it should be of the order of 150 amperes or higher and about 4 volts or more, depending upon the amperage of the current.

Treatment in batch may be completed in two or three minutes after which the liquid is discharged as waste and the solids which have been coagulated by electrolysis are removed from the apparatus and dried. If the slop is treated in flow the liquid is re-cycled through the electrolyzer until it is clear and shows no turbidity. The solids are then recovered and dried, and the liquid discarded as above described.

The resulting product is valuable as a cattle feed or fertilizer depending upon its pH value. The acidity expressed in pH should not be lower than 3.6 nor over 7.0 where it is for use as cattle feed, but the maximum value may be exceeded where other uses are intended for it.

Although the addition of ionizing materials to whole slop is not an essential part of my process, about 0.5 percent by weight of common salt not only facilitates electrolysis but also constitutes a desirable addition to the ultimate product when that product is to be used as cattle feed. Other salts in small quantity may be substituted for sodium chloride, or materials such as lime, soda ash or caustic soda may be added if increased alkalinity is desired.

Slop resulting from the preparation of other alcoholic liquids, or from the use of other starchy materials may also be treated in the manner above set forth. The conditions of time and electric current are likely to be somewhat different from those herein stated but in general the same results may be achieved by the same method, the whole slop being electrolyzed while hot.

I claim:

1. A process of treating slop produced in the manufacture of alcohol containing distilled liquids which comprises electrolyzing whole slop at an elevated temperature below boiling at a pH of 3.6–7.0 by direct current of a density of at least 30 amperes per square foot of electrode surface to coagulate the solids therein, and collecting the said solids.

2. A process of treating slop produced in the manufacture of alcohol containing distilled liquids which comprises electrolyzing whole slop at a temperature of from 120° to 180° F. at a pH of 3.6–7.0 by direct current of a density of at least 30 amperes per square foot of electrode surface to coagulate the solids therein, and collecting the said solids.

3. A process of treating slop produced in the manufacture of alcohol containing distilled liquids which comprises adding to whole slop approximately 0.5% by weight of an ionizable compound of the class consisting of sodium chloride and alkalies, maintaining the acidity expressed in pH between the values 3.6–7.0, heating the so treated whole slop to a temperature of 120° to 180° F., electrolyzing the heated whole slop by direct current of a density of at least 30 amperes per square foot of electrode surface to coagulate the solids therein, and collecting and drying the said solids.

CHARLES J. BROCKMAN.